UNITED STATES PATENT OFFICE.

ALEXANDER P. ASHBOURNE, OF BOSTON, MASSACHUSETTS.

REFINING COCOANUT-OIL.

SPECIFICATION forming part of Letters Patent No. 230,518, dated July 27, 1880.

Application filed September 29, 1879.

*To all whom it may concern:*

Be it known that I, ALEXANDER P. ASHBOURNE, of Boston, in the county of Suffolk and State of Massachusetts, have invented certain new and useful improvements in processes for the preparation of cocoanut-oil for medicinal and general toilet purposes, of which the following is a specification.

My invention relates to a novel and improved process for the preparation of cocoanut-oil, by which I am enabled to prepare the same so that it will keep sweet and fresh for many years.

In order to properly carry out my process, I take any quantity of the nuts and carefully pare them, then take the meats and pass them through a pulverizer or grate them fine, and then place the grated cocoanut into a large steamer or other vessel, and subject the same to steam heat for four hours. Then to each one hundred pounds of the steamed meats I add four gallons of boiling water, and boil the same for one hour, stirring the mass frequently. When it is done I place it in a large bag or cloth, and then subject the same to a powerful press, so as to press it perfectly dry, which will remove all the oil from the meat, leaving it a white liquid, which is to be placed in a copper boiler and brought to a gentle boil until it gathers a head. The oil is then separated from the water, and then scummed and placed in porcelain-lined kettles, and again boiled for three hours, when the coarse refuse matter settles at the bottom, leaving a clear oil on top, which is to be drawn off and placed in another glazed kettle to be refined. Then add to each gallon of pure oil three table-spoonfuls of pulverized white sugar and the whites and shells of three eggs and one-half ounce of alum. Then place over the kettle a condenser to catch the steam or evaporation from the boiling oil. The kettle is then placed over a slow fire for one hour and a half and gently boiled.

The steam that evaporates from the oil into the condenser carries off the properties which would otherwise cause the oil soon to become rancid were it not treated with the sugar, alum, and whites of eggs and shells, which leave the product or oil pure and white.

Having thus described my invention, what I claim is—

In the process of refining cocoanut-oil for medicinal and toilet use, boiling it with sugar, eggs, and alum, substantially as and for the purposes set forth.

ALEXANDER P. ASHBOURNE.

Witnesses:
 SYLVENUS WALKER,
 L. B. GRAY.